July 25, 1967 A. H. WILLINGER 3,332,544
PACKAGING ARRANGEMENT FOR AN AQUARIUM
Filed Nov. 17, 1964 3 Sheets-Sheet 1

INVENTOR.
ALLAN H. WILLINGER
BY Friedman & Goodman
ATTORNEYS

July 25, 1967 A. H. WILLINGER 3,332,544
PACKAGING ARRANGEMENT FOR AN AQUARIUM
Filed Nov. 17, 1964 3 Sheets-Sheet 2
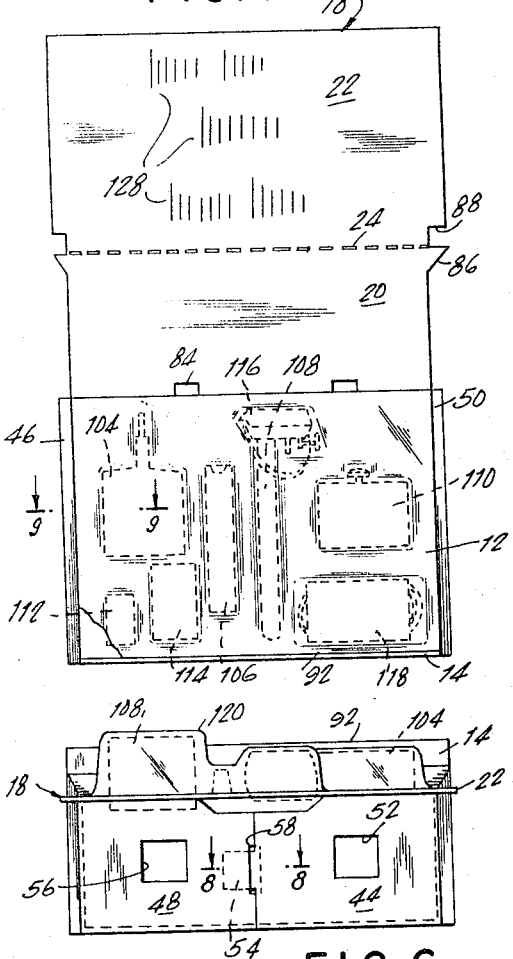
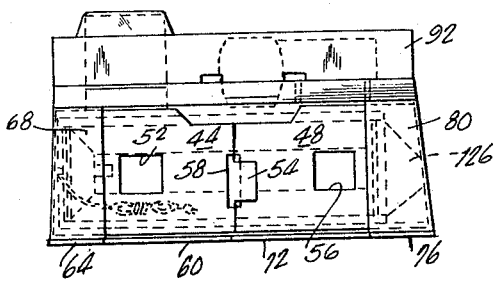
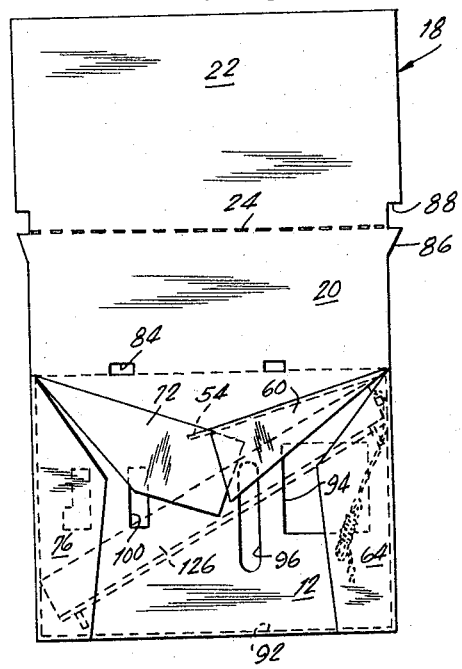
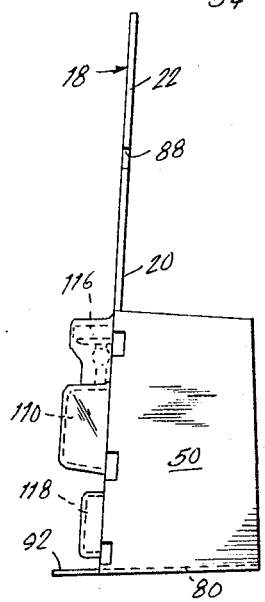
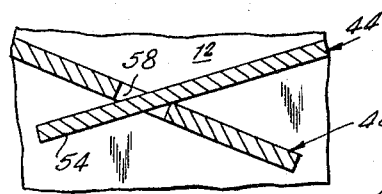
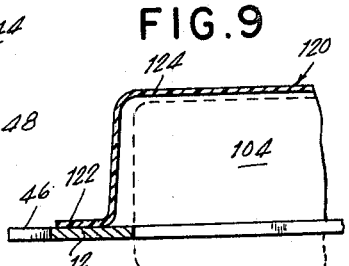
INVENTOR.
ALLAN H. WILLINGER
BY
Friedman & Goodman
ATTORNEYS July 25, 1967    A. H. WILLINGER    3,332,544
PACKAGING ARRANGEMENT FOR AN AQUARIUM
Filed Nov. 17, 1964    3 Sheets-Sheet 3

INVENTOR.
ALLAN H. WILLINGER
BY Friedman & Goodman
ATTORNEYS

United States Patent Office 3,332,544
Patented July 25, 1967

3,332,544
PACKAGING ARRANGEMENT FOR AN
AQUARIUM
Allan H. Willinger, New Rochelle, N.Y., assignor to
Aquariums Incorporated, Maywood, N.J., a corporation
of Delaware
Filed Nov. 17, 1964, Ser. No. 411,761
5 Claims. (Cl. 206—44)

ABSTRACT OF THE DISCLOSURE

A packaging arrangement for an aquarium wherein a transparent aquarium tank is provided with a mounting board positioned within the tank, which board carries a plurality of aquarium articles thus visible through the tank. The mounting board may have a transparent overlay or comprise a boxlike structure having a position defining a top wall or may provide a mount for a light reflection; all as may be more particularly understood from the accompanying specification.

The present invention relates to a packaging arrangement and packing means particularly adapted to be used in connection with the packaging, shipment, display, and sale of aquarium equipment.

The breeding and care of fish, particularly tropical fish, is a relatively widespread hobby and source of study and education for young and old people alike. In addition to an aquarium tank, the practice if this hobby also requires additional auxiliary equipment and supplies. For example, in order to operate an efficient aquarium, one should use an electric air pump, a filter aerator, a thermometer, an automatic heater, and of course the necessary air line tubing for the aerator. In addition, various supplies are required such as filter charcoal, fish food and antichlor. Heretofore, these items have been separately sold and separately packaged so that it became necessary on the one hand for the retailer to stock a separate inventory of each of these items and on the other hand for the purchaser to make a separate selection from each of these items. A beginner wishing to start the aquarium hobby would not necessarily have knowledge of the various auxiliary items and supplies required in addition to the aquarium itself. Consequently it frequently happened that the beginner forgot or did not have sufficient knowledge to purchase essential auxiliary equipment, with the result that his initial efforts at raising and breeding fish were frequently unsuccessful. This in many cases tended to discourage the beginner with the result that he discontinued the otherwise interesting and educational hobby.

It is an object of the present invention to provide a packaging arrangement and packaging means whereby an aquarium tank and the related auxiliary equipment and supplies may be assembled in a single package for display and sale to purchasers.

Another object of this arrangement is to provide a packaging means for facilitating the packaging and the display of these items as a single unit.

Another object of the present invention is to provide a packaging board or support whereby the various auxiliary equipment and supplies required to raise and study fish life may be included in the package containing the aquarium tank and kept in an aesthetically pleasing position during packaging, shipment, and display, and whereby the items are kept from shifting their position during such shipment and handling.

Other and further objects and advantages of the present invention will become apparent to one skilled in the art from the following specification taken in connection with the appended drawings which illustrate the best mode presently contemplated for carrying out the invention.

Figure 1:
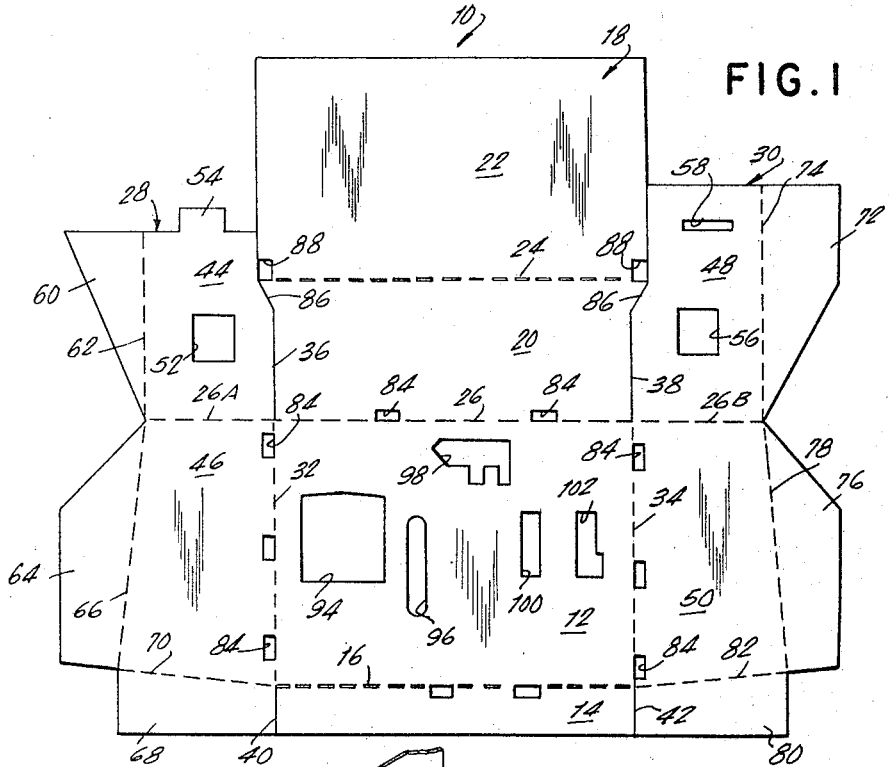
Figure 2:
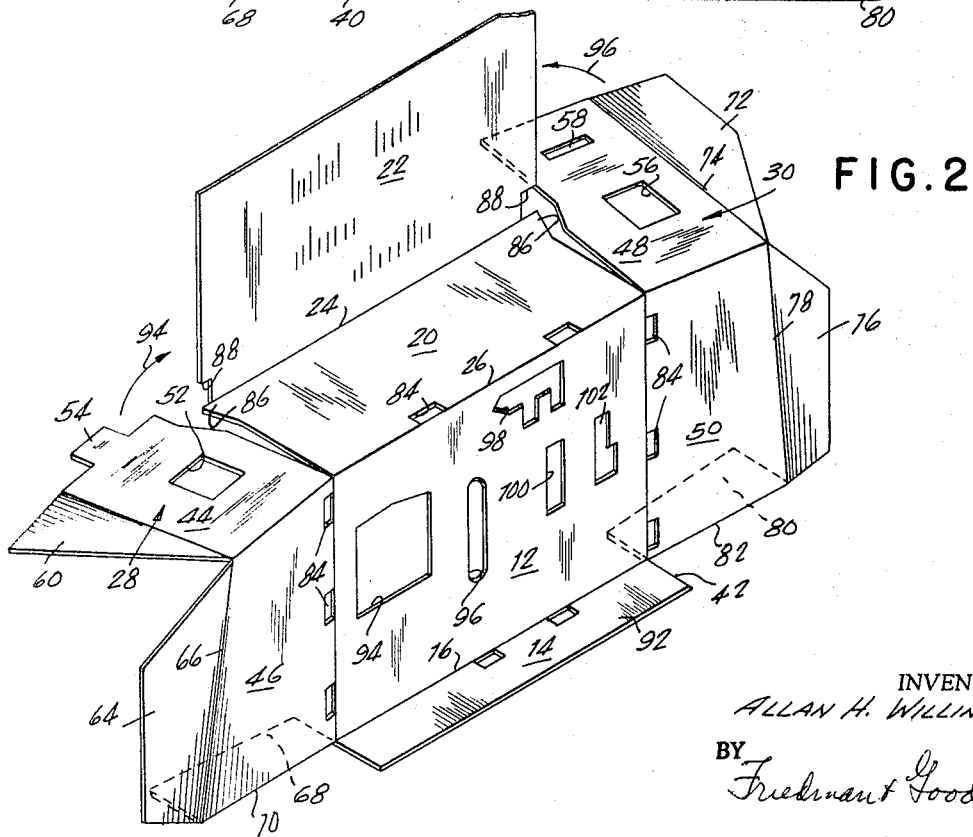
Figure 10:
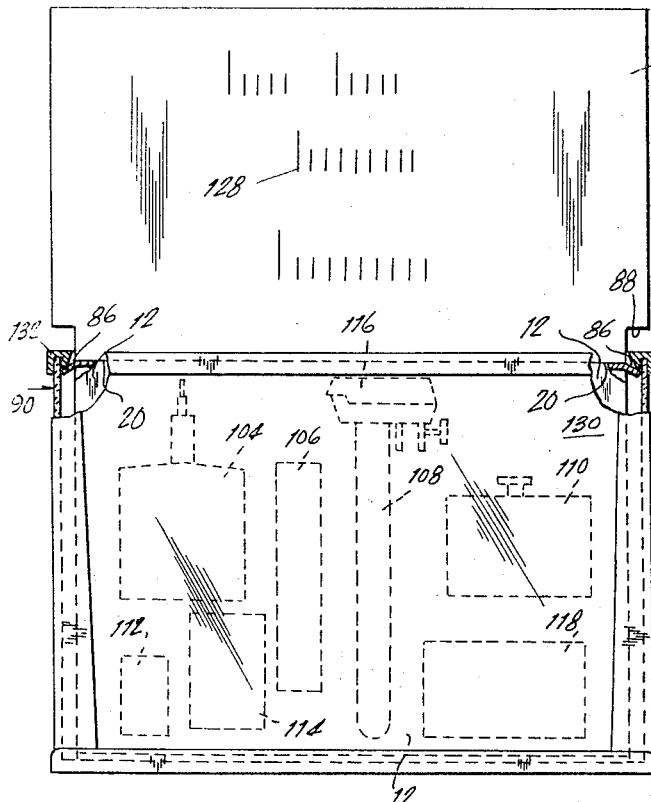
Figure 11:
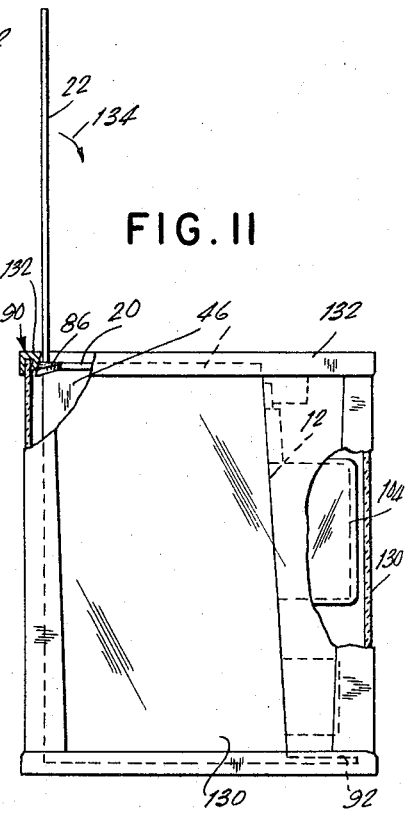
Figure 12:
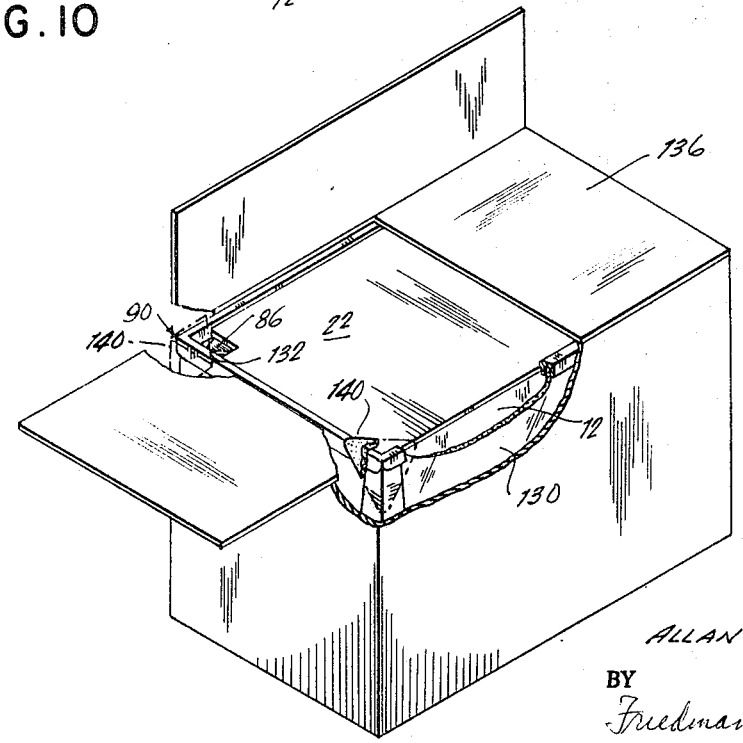

FIGURE 1 is a plan view of the blank from which a packaging board or card pursuant to the present invention is formed;
FIGURE 2 is a perspective view and illustrates the erection of the blank or board shown in FIGURE 1;
FIGURE 3 is a front elevation view of the erected board with the auxiliary equipment and supplies provided thereon;
FIGURE 4 is a bottom plan view taken in the direction of the arrow 4 in FIGURE 3;
FIGURE 5 is a rear elevation view;
FIGURE 6 is a top plan view taken in the direction of arrow 6 in FIGURE 3;
FIGURE 7 is an end view taken in the direction of the arrow 7 in FIGURE 3;
FIGURE 8 is a fragmentary detail view on an enlarged scale taken on the line 8—8 of FIGURE 6;
FIGURE 9 is a fragmentary detail view on an enlarged scale taken on the line 9—9 of FIGURE 3;
FIGURE 10 is a front elevation view of an aquarium tank provided with a packaging board pursuant to the present invention, the board mounting aquarium accessories and being erected for display purposes, parts being broken away for purposes of illustration;
FIGURE 11 is a side view of the aquarium tank and board illustrated in FIGURE 10 with parts broken away for purposes of illustration; and
FIGURE 12 is a perspective view of the aquarium tank and mounting board contained within a shipping carton.

Referring now to the drawings in detail and to FIGURES 1 and 2 in particular, there is shown a packaging board 10 pursuant to the present invention. The packaging board 10 is comprised of a flat blank of heavy paper or cardboard and has a main substantially rectangular body portion 12.

Provision is made for a bottom extension 14 which is foldable relative to the main body portion 12 along a fold line 16. The body portion 12 also has an upper extension which is generally indicated by the reference numeral 18. The upper extension 18 has a lower portion 20 and an upper portion 22, provision being made for a fold line 24 between said portions. A fold line 26 extends between the lower portion 20 and the main body portion 12. It will be noted that the upper portion 22 has a vertical dimension which is less than the vertical dimension of the main body portion 12 but which exceeds the vertical dimension of the lower portion 20.

The main body portion is provided also with the side extensions at each of the side edges thereof which extensions are generally indicated by the reference numerals 28 and 30, respectively. The side extension 28 is connected to the main body portion 12 along the vertical fold line 32 and the side extension 30 is connected to the opposite vertical edge of the main body portion 12 along the fold line 34. It will be noted that the side extension 28 is separated from the upper extension 18 by means of a cut 36 and the side extension 30 is similarly separated from the upper extension 18 by a cut 38. The side extension 28 is also separated from the bottom extension 14 by a cut 40 and in the same manner the side extension 30 is separated from the bottom extension 14 by a cut 42. The side extension 28 is provided also with a fold line 26A which is an extension of the fold line 26 and similarly the side extension 30 is provided with a fold line 26B which is also an extension of the horizontal fold line 26. The fold line 26A divides the side extension 28 into an upper portion 44 which is separated from the upper extension 20 by means of the cut 36 and into a lower portion 46 which is connected to the main body portion 12 by means of the fold line 32. Similarly, the fold line 26B separates the side extension 30 into an upper portion 48 and a lower portion 50. The upper portion 48 is separated from the upper extension 18 by means of the cut 38 and the lower portion 50 is joined to the main body portion 12 along the fold line 34. The upper portion 44 is provided with a substantially square cutout 52 and with a marginal extension 54. The upper portion 48 is provided with a substantially square cut-out 56 and with a rectangular or elongated cut-out 58 which is adapted to receive the extension or tongue 54. The cut-outs 52 and 56 facilitate the manipulation of the upper portions of 44 and 48 during the erection of the board as shown in FIG. 2. The upper portion 44 is provided with a lateral wing 60 which is foldable relative thereto along a fold line 62. The lower portion 46 is provided with a lateral wing 64 which is foldable relative thereto along a fold line 66. The lower portion 46 is provided also with a lower extension or ring 68 which is foldable relative thereto along a fold line 70 and which is separated from the bottom extension 14 by the cut 40.

The upper portion 48 is provided with a lateral extension or wing 72 which is foldable relative thereto along a fold line 74. The lower portion 50 is provided with a lateral wing or extension 76 which is foldable relative thereto along a fold line 78. The lower portion also is provided with a bottom extension for wing 80 which is foldable relative thereto along a fold line 82 and which is separated from the bottom extension 14 by means of the cut 42. Outwardly of each fold line which defines the main body of portion 12 provision is made for cut-outs 84 which facilitate the bending or folding of the packaging board 12 along each one of the fold lines 26, 34, 16 and 32. The lower portion 20 of the upper extension 18 is provided with lateral wings 86—86 which are partially defined by rectangular notches 88—88 defined in the upper portion 22.

Referring now to FIGURE 2 in detail, there is illustrated the method of erecting the packaging board 10 so that various auxiliary aquarium items and equipment may be mounted thereon and the equipped board then mounted in an aquarium tank 90 (FIGS. 10, 11, and 12).

It will be understood FIGURE 1 illustrates the front surface of the mounting board 10. With the board in the position thereof illustrated in FIG. 1, the bottom extension 14 is bent upwardly along the fold line 16 so as to constitute a forwardly extending foot 92 as shown in FIG. 2. The bottom extensions 68 and 80 which straddle the bottom extension 14 and which are separated therefrom by the cuts 40 and 42, respectively, are bent backwardly viewing FIG. 1 and FIG. 2 along the fold lines 70 and 82 as shown in FIG. 2 and define additional feet which together with the foot 92 constitute the bottom supports for the erected packaging board 10. It will be noted from FIG. 2 that the side extensions 28 and 30 are moved inwardly as indicated by the arrows 94 and 96 to an ultimate substantially at right angles to the main body portion 12 extending behind the latter so as to dispose the bottom feet 68 and 80 behind the front foot 92 so as to extend rearwardly substantially at right angles therefrom and thereby provide a three-legged bottom for the mounting board 10. It will be understood that said three-legged support will be substantially a U-shaped support, leg 92 constituting the bight of the support and legs 68 and 80 constituting opposing arms extending rearwardly from the bight 92. In order to fold the lower portions 46 and 50 of the side extensions 28 and 30, respectively, behind the main body portion 12, it is preferably first to bend the upper portions 44 and 48 rearwardly along the fold lines 26A and 26B, respectively, to a substantially right angular disposition relative to the respective lower portions as shown in FIG. 2. Thereupon the respective inward movements of the side extensions as shown by the arrows 94 and 96 will dispose the upper portions 44 and 48 behind the main body portion 12. When so disposed, the tongue 54 is inserted into the slot 58 to releasably lock the side extensions 28 and 30 in position as illustrated in FIGS. 4, 5 and 8. With the side extensions so interlocked, the wings 60 and 72 are bent downwardly along the respective fold lines 62 and 74 as illustrated in FIG. 5. In addition, the wings 64 and 76 are bent inwardly from the lower extension portions 46 and 50, respectively, along the fold lines 66 and 34, respectively, to the position thereof illustrated in FIG. 5.

It will be understood that the wings 76, 48, 44 and 64 are rearwardly spaced from the main body portion 12 which may be considered to be a front wall, the wings 76, 48, 44 and 64 functioning as rear wall portions and the lower side extension portions 46 and 50 functioning as side wall portions. Consequently, it will be understood that the main body portion 12, the side extension portions 46 and 50, and the wings 60, 64, 72 and 76 are in box-like relationship constituting the front wall, the side walls and rear wall portions of a box-like structure. The upper or top wall of the box-like structure is constituted by a lower portion 20 of upper extension 18 which folds rearwardly from the main body portion 12 along the fold line 26 as best shown in FIG. 2. The upper portion 22 of the upper extension 18 folds upwardly relative to the lower portion 20 along the fold line 24 and functions both as a display board and as a cover for the box-like arrangement as hereinafter described in detail.

With the packaging board erected as illustrated in FIGS. 3, 4, 5 and 6, the various auxiliary aquarium items may be readily retained thereon. More specifically, and for this purpose, it will be noted that the main body portion 12 is provided with a substantially rectangular cut-out 94, an elongated oval ended cut-out 96, a substantially S-shaped cut-out 98, an elongated rectangular cut-out 100, and a substantially L-shaped cut-out 102. The cut-out 94 is adapted to mount a filter aerator 104. The cut-out 96 is adapted to mount a hanging thermometer 106 for indicating the temperature of the aquarium water which would be aerated by the filter aerator 104. The cut-out 98 is adapted to mount an automatic heater 108 for the aquarium water. The cut-outs 100 and 102 mount an electric air pump for the aquarium water which air pump is indicated by the reference numeral 110. It will be understood that the electric wire for the heater 108 extends rearwardly behind the main body portion 12 through the cut-out 98 and similarly the electric wire for the air pump 110 extends rearwardly from the body portion 12 through the cut-out 100. In addition to mounting the relatively heavier auxiliary equipment for the aquarium by means of the various cut-outs therein, the main body portion 12 is also adapted to mount on the front surface thereof the various supply items used with the aquarium. In this connection a package of fish food 112 is mounted on the front surface of the main body portion 12 below the filter aerator 104 and a package of antichlor indicated by the reference numeral 114 is mounted laterally of the fish food package 112 below the aerator 104. It will be understood that the cut-out 98 also serves to mount a package of filter charcoal and filter glass wool generally indicated by the reference numeral 116 above the automatic heater 108. In addition, a package of airline tubing generally indicated by the reference numeral 118, is mounted on the front surface of the main body portion 12 below the electric air pump 110. The various items of auxiliary equipment and aquarium supply which are mounted on the main body portion 12 are retained in position thereon by means of an overlying sheet of transparent plastic material generally indicated by the reference numeral 120 (FIG. 9). The sheet 120 is provided with marginal edges 122 which are suitably secured in conventional manner to the front surface of the main body portion 12. The plastic sheet 120 has recessed pockets 124 defined therein to accommodate the various items of auxiliary aquarium equipment and aquarium supplies described above. It will be understood that the sheet 120 may be readily removed from the main body portion 12 so as to provide access to the various items mounted thereon.

When the packaging board 10 is used as a display item the upper extension 18 is maintained in erect condition as shown in FIGS. 3, 5 and 7. For display purposes an electric light reflector 126 may be suitably mounted on the front surface of the lower portion 20 and the front surface of the upper portion 22 is provided with suitable printed matter or other advertising indicia, generally indicated by the reference numeral 128 in FIG. 3. If desired, the bottom portion 20 may be folded back from the position thereof shown in FIG. 20 along the fold line 26 so as to overlie the upper side extension portions 44 and 48 and constitute a top wall for the previously described box-like arrangement. In such disposition the electric light reflector 126 would be seated or mounted thereo. Consequently, it will be apparent that the various items required for the aquarium would be mounted on the mounting board and displayed thereby. In order to complete the display of the aquarium and all of its associated items, the mounting board 10 with the various auxiliary items mounted thereon, may be inserted into the previously identified aquarium tank 90 as best shown in FIGS. 10 and 11. When so inserted, it is preferable that the lower portion 20 of the upper extension 18 be bent backward as previously described and the reflector 126 may be seated upon the bent back portion to complete the display of all of the various items incorporated within the aquarium, the items being readily visible through the transparent walls 130 of the aquarium 90. It will be understood that the aquarium 90 is of conventional construction being provided with the transparent walls 130 preferably formed of glass which are retained in position by the metallic brackets 132 which together constitute a frame mounting for the aquarium walls.

When it is desired to ship the mounting board, the various auxiliary items contained thereon, and the aquarium tank 90, the reflector 126 is not mounted on the mounting board 10 in the display position thereof as previously described but it is inserted within the box-like structure defined by the main body portion 12, the side extension portions 46 and 50 and the wings 64 and 76, as best shown in FIG. 5. It will be understood that when the reflector is so disposed within the box-like structure it is wedged in position so that it will not move relative to the box-like structure. With the reflector so disposed within the box-like structure and with the mounting board disposed in the aquarium 90 as illustrated in FIGS. 10 and 11, the upper portion 22 of the upper extension 18 may then be folded rearwardly in the direction of the arrow 134 in FIG. 11 so as to overlie the lower extension portion 20. Consequently, it will be apparent that when the upper extension portion 22 is so folded back, every part of the mounting board 10 and 11 of the equipments mounted thereby including the light reflector are all contained within the confines of the aquarium 90. The aquarium 90 may then be inserted into a conventional cardboard or paperboard shipping carton 136 as shown in FIG. 12 and when the carton is closed the aquarium and its confines may be readily stored within the carton for shipment therewith as desired. Consequently, it will be apparent that the upper extension 22 serves as a display or advertising area in the conditioning of the various elements shown in FIGS. 10 and 11 and serves as a protective cover for the contents of the aquarium when it is folded over as shown in FIG. 12.

Provision is also made for flexible or resilient corner spacers or protective corner pieces 140 at each corner of the aquarium when the latter is disposed in the carton. For example, and not by way of limitations, such pieces may be made of corrugated or foamed polystyrene.

In view of the foregoing it will be apparent that there has been illustrated and described a highly novel and efficient aquarium packaging arrangement. It will be understood that various changes and modifications may be made therein without however, departing from the basic inventive concept thereof as set forth in the appended claims.

I claim:
1. An aquarium package comprising a transparent aquarium tank and a mounting board positioned within said aquarium tank, said mounting board having a main body portion, and a plurality of aquarium articles mounted by said main body portion and visible through said tank, and a transparent overlay provided on said main body portion for retaining said articles in position thereon.

2. An aquarium package comprising a transparent aquarium tank and a mounting board positioned within said aquarium tank, said mounting board having a main body portion, a plurality of aquarium articles mounted by said main body portion and visible through said tank, said mounting board having portions which cooperate with said main body portion to define a box-like structure which substantially fills said tank.

3. A packaging arrangement as in claim 2, said mounting board having a portion extending from said main body portion and foldable relative thereto to define a top wall for said box-like structure, said top wall being adapted to mount a light reflector.

4. A packaging arrangement as in claim 2, and a light reflector mounted within said box-like structure.

5. A packaging arrangement as in claim 2, said mounting board having a portion extending from said main body portion and foldable relative thereto to define a top wall for said box-like structure, said top wall being adapted to mount a light reflector, and said mounting board having an additional portion extending from said top wall and foldable relative thereto to define a cover for said box in the folded condition of said additional portion and to define an advertising space in the unfolded condition thereof.

References Cited
UNITED STATES PATENTS

| | | | |
|---|---|---|---|
| 2,807,362 | 9/1957 | Haddad | 206—78 X |
| 2,845,758 | 8/1958 | Lowthian | 206—78 X |
| 2,998,131 | 8/1961 | Irwin | 206—79 X |

LOUIS G. MANCENE, *Primary Examiner.*